US009515323B2

(12) United States Patent
Serov et al.

(10) Patent No.: US 9,515,323 B2
(45) Date of Patent: Dec. 6, 2016

(54) CATHODE CATALYSTS FOR FUEL CELLS

(71) Applicant: STC.UNM, Albuquerque, NM (US)

(72) Inventors: Alexey Serov, Albuquerque, NM (US); Barr Halevi, Albuquerque, NM (US); Kateryna Artyushkova, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 37 days.

(21) Appl. No.: 14/376,146

(22) PCT Filed: Feb. 1, 2013

(86) PCT No.: PCT/US2013/024477
§ 371 (c)(1),
(2) Date: Aug. 1, 2014

(87) PCT Pub. No.: WO2013/116754
PCT Pub. Date: Aug. 8, 2013

(65) Prior Publication Data
US 2014/0371057 A1    Dec. 18, 2014

Related U.S. Application Data

(60) Provisional application No. 61/593,542, filed on Feb. 1, 2012.

(51) Int. Cl.
| | | |
|---|---|---|
| *B01J 38/02* | (2006.01) |
| *B01J 27/057* | (2006.01) |
| *B01J 27/20* | (2006.01) |
| *B01J 27/24* | (2006.01) |
| *H01M 4/90* | (2006.01) |
| *B01J 37/08* | (2006.01) |
| *B01J 23/70* | (2006.01) |
| *H01M 8/02* | (2016.01) |
| *H01M 8/10* | (2016.01) |
| *H01M 4/86* | (2006.01) |
| *H01M 4/88* | (2006.01) |

(52) U.S. Cl.
CPC ............... *H01M 4/90* (2013.01); *B01J 23/70* (2013.01); *B01J 37/08* (2013.01); *H01M 4/8605* (2013.01); *H01M 4/88* (2013.01); *H01M 8/02* (2013.01); *H01M 8/1002* (2013.01); *Y02E 60/521* (2013.01)

(58) Field of Classification Search
CPC .......... B01J 27/02; B01J 27/057; B01J 27/20; B01J 27/24
USPC ................... 502/174, 200, 215, 216
See application file for complete search history.

(56) References Cited

U.S. PATENT DOCUMENTS

| | | | |
|---|---|---|---|
| 7,678,728 B2* | 3/2010 | Olson ............... | B01J 31/06 427/115 |
| 2008/0160391 A1* | 7/2008 | Joo ............... | B01J 21/18 429/482 |
| 2009/0075139 A1* | 3/2009 | Kucernak ........... | H01M 4/8605 429/532 |

(Continued)

*Primary Examiner* — Patricia L Hailey
(74) *Attorney, Agent, or Firm* — Gonzales Patent Services; Ellen M. Gonzales

(57) ABSTRACT

A method of preparation of metal-chalcogen-nitrogen-carbon (M-Ch-N—C) catalytic material utilizing a sacrificial support approach and using inexpensive and readily available precursors is described. Furthermore, the catalytic materials synthesized using the disclosed methods include multiple types of active sites.

13 Claims, 4 Drawing Sheets

(56) References Cited

U.S. PATENT DOCUMENTS

| | | | |
|---|---|---|---|
| 2010/0167106 A1* | 7/2010 | Pak | H01M 4/8814 |
| | | | 429/525 |
| 2013/0217840 A1* | 8/2013 | McCleskey | C08K 3/10 |
| | | | 525/540 |
| 2013/0330658 A1* | 12/2013 | Palmqvist | B01J 31/1625 |
| | | | 429/532 |

* cited by examiner

CATHODE CATALYSTS FOR FUEL CELLS

CROSS-REFERENCE TO RELATED APPLICATIONS

The following application claims benefit of U.S. Provisional Application No. 61/593,542 which is hereby incorporated by reference in its entirety.

STATEMENT REGARDING GOVERNMENT SPONSORED RESEARCH

This invention was made with Government support under Grant No. 503016-78051 awarded by the DOE and Grant No. 2RQ83 awarded by the DOE-EERE . The U.S. Government has certain rights in this invention.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions (H+) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Nobel metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc).

SUMMARY

In the present disclosure a method of preparation of metal-chalcogen-nitrogen-carbon (M-Ch-N—C) catalystic material utilizing a sacrificial support approach and using inexpensive and readily available precursors is described. Furthermore, the catalytic materials synthesized using the disclosed methods include multiple types of active sites.

DETAILED DESCRIPTION

Figure 1:
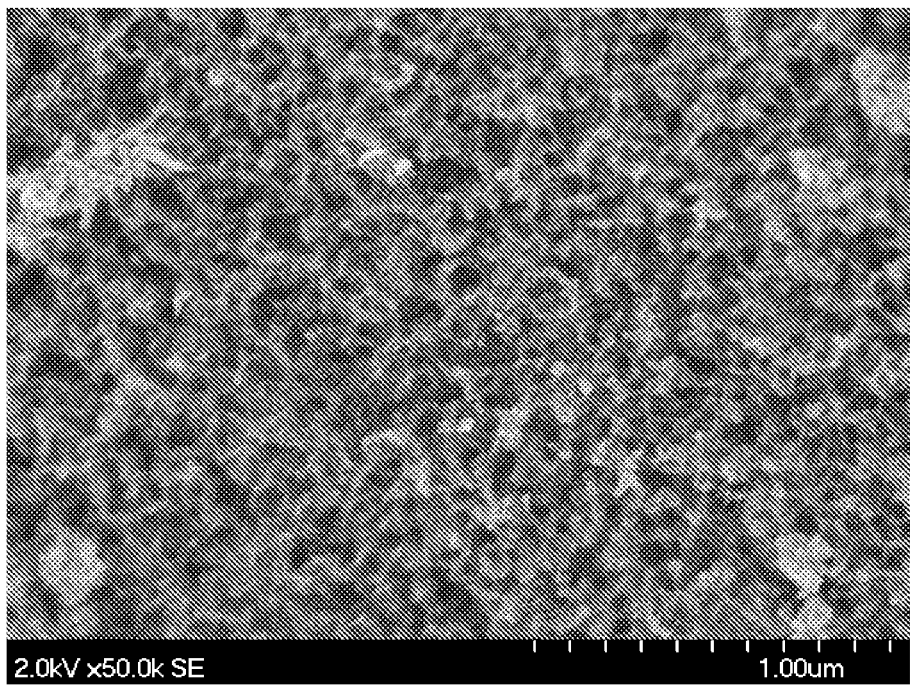
FIG. 1 is an SEM image of a Co—Se-AAPyr (Se=selenious acid, AAPyr=4-aminoantipyrine) catalyst formed using the single step synthesis method described herein.

According to an embodiment the present disclosure provides novel catalysts and catalytic materials and methods for making the same. In contrast to many previously described methods of producing M-N—C-based catalytic materials, which designed to produce a catalytic material containing only one type of active site, the presently described method results in a catalytic material containing multiple types of active sites.

For the sake of clarity, in the present application the term "catalyst" is used to refer to a final product, suitable for use, for example, in a fuel cell, which has catalytic activity. The catalyst may include multiple types of materials, some of which may not in themselves have catalytic activity (for example, supporting material.) The term "catalytic material" is any material which has catalytic activity either on its own or as part of a catalyst.

Furthermore, for the purposes of the present application the term "active site" is used to mean the specific chemical moieties which engage and interact with a reactant during a catalytic reaction. Moreover, as used herein, active sites are considered to be of the same "type" if they catalyze the same type of reaction through the same mechanism.

Standard methodologies for producing catalysts rely on the process of identifying the main catalytic reaction for which the catalyst is to be used; identifying and preparing a catalytic material having a particular type of active site which is known to be selective for the identified catalytic reaction; and then post-treating the material to actively remove: anything that is deemed to be inferior to the identified type of active site (including both active sites having lower catalytic activity than the identified active site and inactive sites); anything that could potential interfere with the performance of the identified type of active site (whether by competition, physical blocking, etc.); or anything that could potentially poison or otherwise harm components of the catalytic system. With regard to potentially poisonous moieties for example, it is well known that metallic iron and cobalt are not only catalytically inactive, but are also strongly poisonous to membrane materials. Accordingly, previously described methodologies have frequently included the removal of metallic iron and cobalt. Removal of undesirable sites is typically performed by various chemical and mechanical processes, including, for example: leaching, passivation, sintering etc. In situations where a sacrificial support is used, the leaching step may serve the dual purpose of both removing any sacrificial support that might be present and removing unprotected iron and/or other metals from the material. See e.g., M. H. Robson, A. Serov, K. Artyushkova, P. Atanassov "A Mechanistic Study of 4-Aminoantipyrine and Iron Derived Non-Platinum Group Metal Catalyst on the Oxygen Reduction Reaction" Electrochim Acta, 90 (2013) Pages 656-665; S. Brocato, A. Serov, P. Atanassov "pH Dependence of Catalytic Activity for ORR of the non-PGM Catalyst Derived from Heat-Treated Fe-Phenanthroline" Electrochim Acta, 87 (2013) 361-365; A. Serov, M. H. Robson, K. Artyushkova, P. Atanassov "Templated non-PGM cathode catalysts derived from iron and poly(ethyleneimine) precursors" Appl. Catal. B 127 (2012) 300-306; A. Serov, M. H. Robson, M. Smolnik, P. Atanassov "Templated bi-metallic non-PGM catalysts for oxygen reduction" Electrochim Acta 80 (2012) 213-218; A. Serov, U. Martinez, A. Falase, P. Atanassov "Highly Active Pd—Cu Catalysts for Electrooxidation of 2-Propanol" Electrochem. Comm 22 (2012) 193-196; A. Serov, M. H. Robson, B. Halevi, K. Artyushkova, P. Atanassov "Highly Active and Durable Templated Non-PGM Cathode Catalysts Derived from Iron and Aminoantipyrine" Electrochem. Comm 22 (2012) 53-56; and A. Falase, M. Main, K. Garcia, A. Serov, C. Lau, Plamen Atanassov "Electrooxidation of ethylene glycol and glycerol by platinum-based binary and ternary nano-structured catalysts", Electrochim Acta 66 (2012) 295-301, each of which is hereby incorporated by reference.

The presently described method takes an entirely different approach. Rather than removing undesirable sites, the present disclosure presents a process whereby the catalytic activity of the less desirable sites, whether inferior, interfering, or poisonous is enhanced to produce a catalytic material having multiple types of active sites, all of which are able to significantly contribute to the catalytic activity of the resulting material.

According to an embodiment, enhancement of the catalytic activity of less desirable sites is achieved by introducing a chalcogenide precursor into the synthesis process. The chalcogenide precursor initially binds to and forms a protective shell around iron or other metal elements present in the starting material. The chacogenide-metal composite is then converted into an active site, typically via pyrolysis.

A chalcogenide is a chemical compound consisting of at least one chalcogen ion and at least one more electropositive element. While all group 16 elements of the periodic table are technically defined as chalcogens, for the purposes of the present disclosure, the term is used to refer to sulfides, selenides, and tellurides, rather than oxides, which is how the term is most commonly used by those of skill in the art.

The present disclosure provides both one-step and two-step synthesis methods for the M-Ch-N—C catalytic materials described herein. Both steps rely on the introduction of metal and N—C precursors onto a sacrificial support. As described in greater detail below, introduction of the chalcogens precursor may take place simultaneously with the initial introduction of the metal and N—C precursors, or after an initial pyrolysis step.

According to a more specific one-step example, a catalytic material according to the present disclosure may be synthesized via wet impregnation of iron precursors in the form of iron nitrate, N—C precursors in the form of 4-Aminoantipyrine, and a chalcogens precursor in the form of chalcogenides acids onto the surface of a sacrificial support of fumed silica. It will be appreciated that the sacrificial support may be synthesized and infused in a single synthesis step or the sacrificial support may be synthesized first (or otherwise obtained) and then infused with the appropriate precursors. The infused sacrificial support is then subjected to heat treatment, (such as pyrolysis) in an inert ($N_2$, Ar, He, etc.) or reactive ($NH_3$, acetonitrile, etc.) atmosphere.

Suitable iron precursors along with the above-identified iron nitrate include, but are not limited to, iron sulfate, iron acetate, iron chloride etc. Furthermore, it will be appreciated that other transition metals such as Ce, Cr, Cu Mo, Ni, Ru, Ta, Ti, V, W, and Zr can be substituted in place of iron, by simply using precursors of those metals instead. Exemplary transition metal precursors include, but are not limited to cerium nitrate, chromium nitrate, copper nitrate, ammonium molybdate, nickel nitrate, ruthenium chloride, tantalum isopropoxide, titanium ethoxide, vanadium sulfate, ammonium tunstanate and zirconium nitrate. Furthermore, according to some embodiments the presently described methodologies may utilize precursors of two or more metals to produce multi-metallic catalysts.

In general, nitrogen-carbon precursors suitable for use in the presently described methods are organic molecules that either have low molecular weight or are polymeric. They can be aliphatic, cyclic or aromatic. Furthermore, the nitrogen can be incorporated in an aromatic ring, aliphatic chain or in a cyclic compound. Suitable N—C compounds can also include other hetero-atoms, like O, S, B, Se, etc. Suitable N—C precursors include, but are not limited to 4-aminoantipyrine (AAPyr), Polyethyleneamine; ethylenediamine branched; 1,2-Phenyanthroline; Phenanthroline; Poly(2-ethyl-2-oxazoline); Poly(4-vinylpyridine); Poly(acrylamide-co-diallyldimethylammonium chloride) solution; Poly (melamine-co-formaldehyde) methylated, solution; Poly (pyromellitic dianhydride-co-4,4?-oxydianiline), amic acid solution; Poly(dimethylamine-co-epichlorohydrin-co-ethylenediamine) solution; Poly(1-vinylpyrrolidone-co-2-dimethylaminoethyl methacrylate) solution; Poly(l-vinylpyrrolidone-co-2-dimethylaminoethyl methacrylate) solution; Poly [[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]; 4-(Aminomethyl) pyridine; 2-Amino-4-picoline; Aminophylline; 2-Amino-6-methylpyridine 98%; 2-Amino-3-picoline; piperazine; Pyrimidyl; imidazole; indole; pyrazole; piperidine; Pyrrolidinyl; pyrrolidine; 4,4?-Oxydianiline;) 1-(2-Aminoethyl) piperazine; Aminophylline; 1,2,4-Triazole; 3,5-Diamino-1, 2,4-triazole; Phenazinemelamine; urea; and family members thereof.

Alternatively, the presently described method could incorporate the use of a salcomine or salcomine-like precursors. Salcomine, bis(salicylidene)ethylene diamino-cobalt (II), and its Fe containing analogs are examples of precursors that contain Co and/or Fe as transition metals, where the nitrogen and oxygen are provided through a combined ligand that coordinates the transition metal to both. These precursors contain a structural motif in which the transition metal, Co or Fe, is coordinated by two nitrogen and two oxygen atoms of the ligand. Accordingly, these precursors enable the designed catalyst to combine functionalities of N and O containing active sites. This allows for active site design in which the two active sites are in immediate proximity to maximize the 2×2 electron transfer, ORR mechanism.

Suitable chalcogenide precursors include, but are not limited to, elemental chalcogens, $H_2Ch$, $H_2ChO_x$, metal salts of chalcogens acids, organic molecules containing Ch (where Ch=S, Se, Te) etc.

Suitable sacrificial supports include, but are not limited to silicas, zeolites, aluminas, and the like. The support may take the form of spheres, particles, or other two or three dimensional regular, irregular, or amorphous shapes. The spheres, particles, or other shapes may be monodisperse, or irregularly sized. The spheres, particles, or other shapes may or may not have pores and such pores may be of the same or different sizes and shapes.

It should be appreciated, and as described in greater detail below, the size and shape of the silica particles may be selected according to the desired shape(s) and size(s) of the voids within the electrocatalyst material. Accordingly, by selecting the particular size and shape of silica particles, one can produce an electrocatalyst having voids of a predictable size and shape. For example, if the silica particles are spheres, the electrocatalyst will contain a plurality of spherical voids. Those of skill in the art will be familiar with the electrocatalyst Pt—Ru black, which consists of a plurality of platinum-ruthenium alloy spheres. An electrocatalyst formed from using silica spheres with the above-described method looks like a negative image of the Pt—Ru black; the space that existed as a void in the Pt—Ru black is filled with metal electrocatalyst, and the space that existed as metal electrocatalyst in the Pt—Ru black is void.

As stated above, according to some embodiments, silica spheres of any diameter may be used. In some preferred embodiments, silica particles having a characteristic length of between 1 nm and 100 nm, in more preferred embodiments, silica particles having characteristic lengths of between 100 nm and 1000 nm may be used and in other preferred embodiments, silica particles having an characteristic lengths of between 1 mm and 10 mm may be used. Further mesoporous silica can also be used in the templating synthesis approach. In this case the templating involves intercalating the mesopores of the material and results in a self-supported electrocatalysts with porosity in the 2-20 nm range. In one particular embodiment, the silica template is Cabosil amorphous fumed silica (325 $m^2/g$). As stated above, because the spheres serve as the template for the formation of the electrocatalyst, in an embodiment where silica particles having an average diameter of 20 nm is used, the spherical voids in the electrocatalyst will typically have a diameter of approximately 20 nm. Those of skill in the art will be familiar with a variety of silica particles that are commercially available, and such particles may be used. Alternatively, known methods of forming silica particles may be employed in order to obtain particles of the desired shape and/or size.

As stated above, after deposition and/or impregnation of the C—N, chalcogens precursors, and metal precursors on the sacrificial support, the material is heat treated either in an inert atmosphere such as $N_2$, Ar, or He, or in a reactive atmosphere such as $NH_3$ or acetonitrile. Inert atmospheres are typically used when the C—N precursor is nitrogen rich, as the inert atmosphere enables the production of a high number of active sites with Fe (or other metal) N4 centers. However, it may be desired to use a nitrogen rich atmosphere if the C—N precursor is rich in carbon and depleted in nitrogen, as the nitrogen rich atmosphere will enable production of the Fe (or other metal) N4 centers.

According to some embodiment, particularly embodiments wherein a single step synthesis method is used, optimal temperatures for heat treatment are typically between 500 and 1100° C. According to some embodiments, heat treatment between 800 and 900° C. is preferred, as this temperature is high enough to pyrolyze the material, but is typically not high enough to destroy the active sites.

After heat treatment, the sacrificial support is removed using suitable means. For example, the sacrificial support may be removed via chemical etching. Examples of suitable etchants include NaOH, KOH, and HF. According to some embodiments, it may be preferable to use KOH, as it preserves all metal and metal oxide in the catalyst and, if the species are catalytically active, use of KOH may, in fact, increase catalytic activity. Alternatively, in some embodiments, HF may be preferred as it is very aggressive and can be used to remove some poisonous species from the surface of the catalyst. Accordingly, those of skill in the art will be able to select the desired etchants based on the particular requirements of the specific catalytic material being formed.

As stated above, the presently described methods can be used to produce a catalytic material containing at least two different types of active sites. As explained above, active sites are considered to be of the same type if they catalyze the same reaction through the same mechanism. For example, the presently described methods could be used to produce a catalytic material containing active sites responsible for oxygen reduction by different mechanisms. For example, catalytic material produced as described herein could produce both Fe—N4 active sites and M-Ch active sites, where the Fe—N4 active cites are active for a direct 4e mechanism of catalysis and the M-Ch active sites utilize a dual site mechanism resulting in the formation of hydrogen peroxide ($H_2O_2$) and water. The hydrogen peroxide can then be further reduced by M-Ch-O active sites.

TABLE 1 shows exemplary conditions for preparation of M-Ch-N—C and the resulting surface area of some synthesized catalytic materials. Specific protocols for the formation of these catalytic materials are provided in the Examples section below.

TABLE 1

Surface area of Prepared Materials

| Catalyst | Precursors | Heat treatment conditions | Silica type | Surface area, $m^2 g^{-1}$ |
| --- | --- | --- | --- | --- |
| Fe—Se—AAPyr | $Fe(NO_3)_3 \cdot 9H_2O$ AAPyr $H_2SeO_3$ | 800° C., 3 h, $N_2$ | Cab-O-Sil, EH5 | 1150 |
| Co—Se—AAPyr | $Co(NO_3)_3 \cdot 6H_2O$ AAPyr $H_2SeO_3$ | 800° C., 3 h, $N_2$ | Cab-O-Sil, EH5 | 1060 |
| Ni—Se—AAPyr | $Ni(NO_3)_3 \cdot 2H_2O$ AAPyr $H_2SeO_3$ | 800° C., 3 h, $N_2$ | Cab-O-Sil, EH5 | 1040 |
| Fe—S—AAPyr | $Fe(NO_3)_3 \cdot 9H_2O$ AAPyr TioUrea | 800° C., 3 h, $N_2$ | Cab-O-Sil, EH5 | 1280 |

FIG. 1 is an SEM image of a Co—Se-AAPyr (AAPyr=4-aminoantipyrine) catalyst formed using the methods described herein, illustrating that this material possesses a highly developed porous structure with pore size about 50-70 nm. The porosity and high surface area improve catalytic properties towards oxygen reduction.

Figure 2:
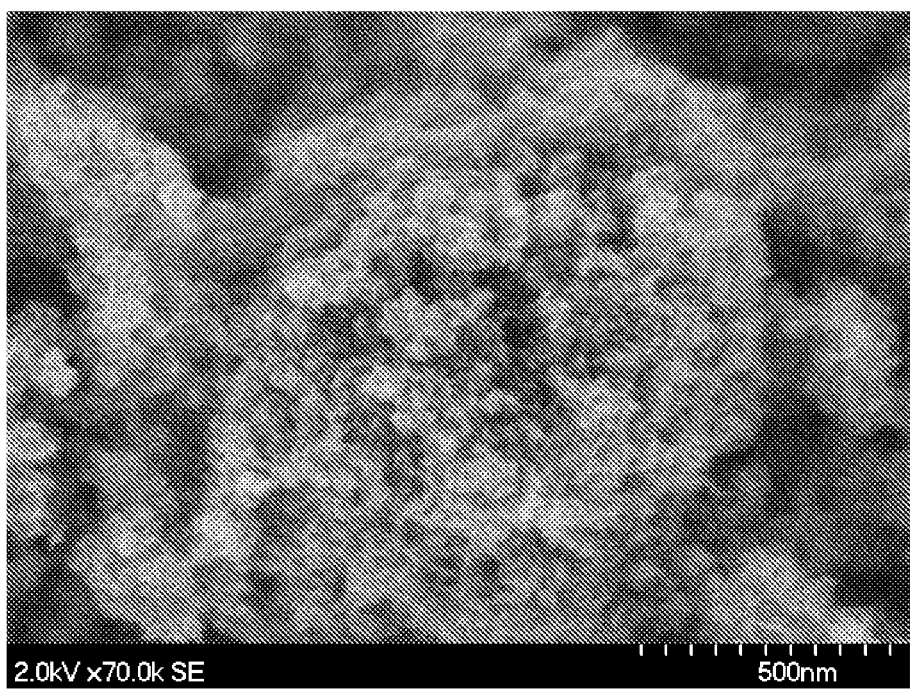
FIG. 2 is an SEM image of a Fe—Se-AAPyr catalyst formed using the single step synthesis method described herein.

FIG. 2 is an SEM image of a Fe—Se-AAPyr catalyst formed using the methods described herein, illustrating that this material possesses a highly developed porous structure with pore size about 30-50 nm. The porosity and high surface area improve catalytic properties towards oxygen reduction.

Figure 3:
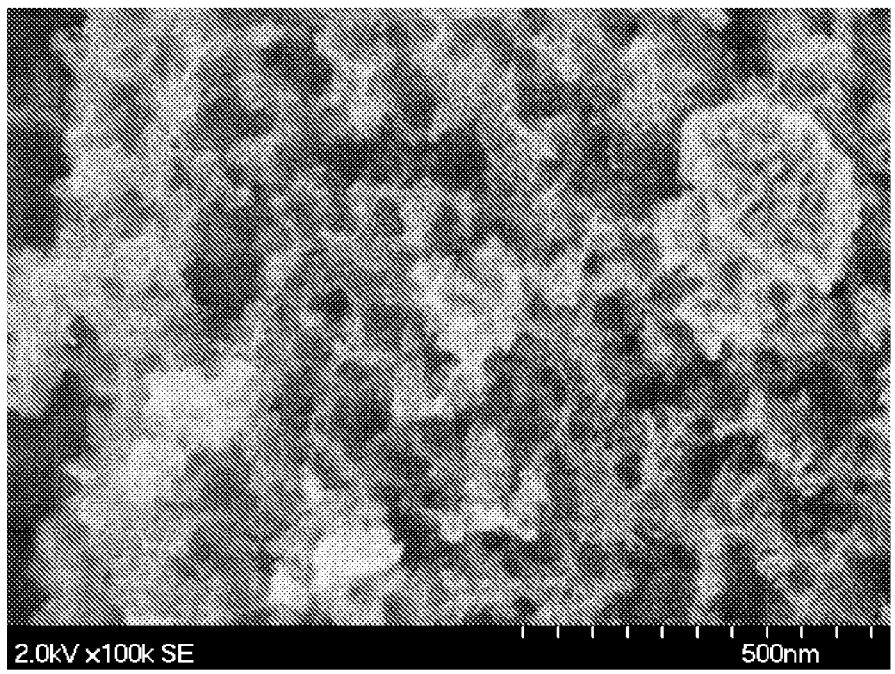
FIG. 3 is an SEM image of a Ni—Se-AAPyr catalyst formed using the single step synthesis method described herein.

FIG. 3 is an SEM image of a Ni—Se-AAPyr catalyst formed using the methods described herein, illustrating that this material possesses a highly developed porous structure with pore size about 50-70 nm. The porosity and high surface area improve catalytic properties towards oxygen reduction.

Figure 4:
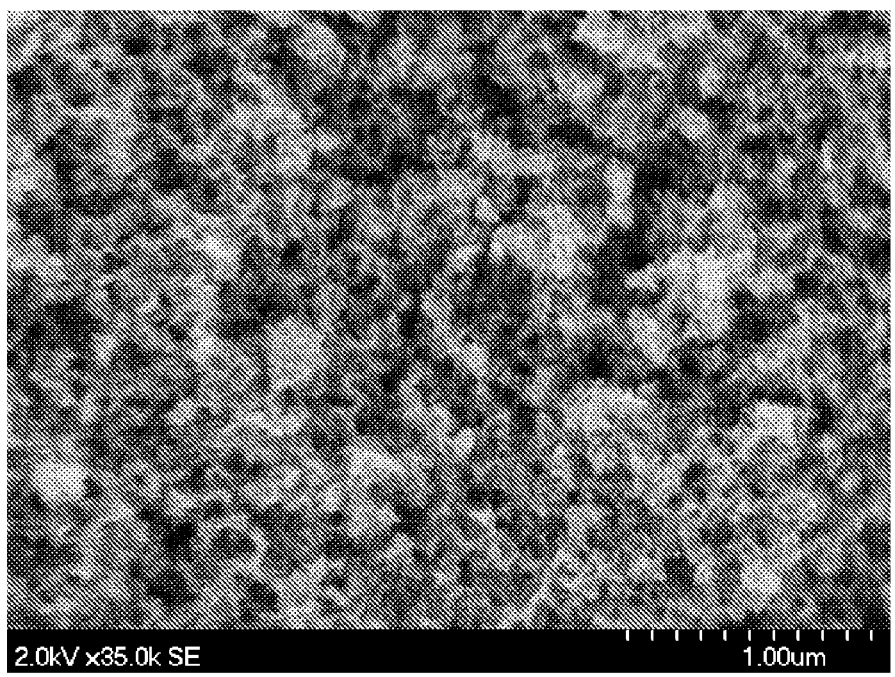
FIG. 4 is an SEM image of a Fe—S-AAPyr (S=tiourea) catalyst formed using the single step synthesis method described herein.

FIG. 4 is an SEM image of a Fe—S-AAPyr catalyst formed using the methods described herein, illustrating that this material possesses a highly developed porous structure with pore size about 50-70 nm. The porosity and high surface area improve catalytic properties towards oxygen reduction.

Figure 5:
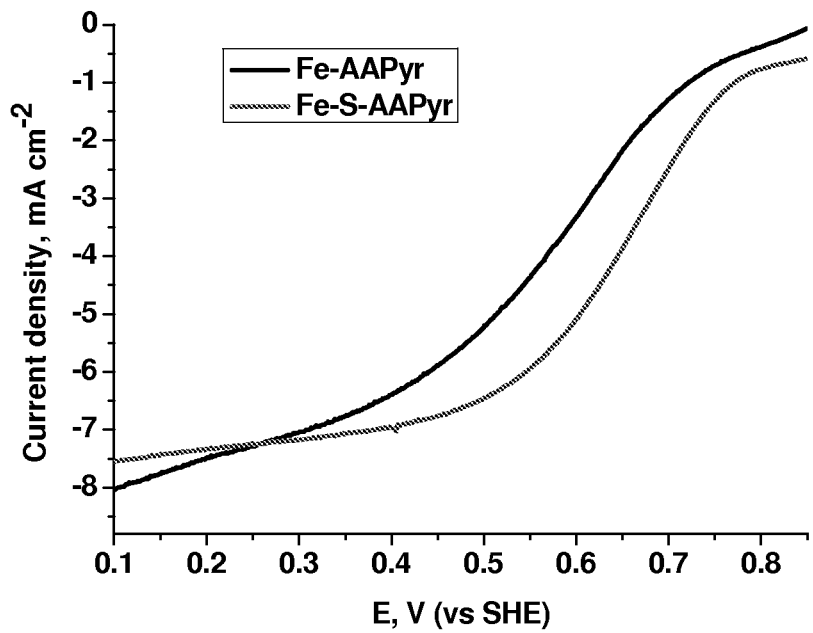
FIG. 5 is a Rotating Disc Electrode electro-voltamogram demonstrating oxygen reduction activity for Fe-AAPyr and Fe—S-AAPyr in 0.5M $H_2SO_4$ saturated with $O_2$ (catalyst loading: 600 mg $cm^{-2}$, 1600 RPM, 10 mV $s^{-1}$).

FIG. 5 is a Rotating Disc Electrode electro-voltamogram demonstrating oxygen reduction activity for Fe-AAPyr and Fe—S-AAPyr in 0.5M H2SO4 saturated with O2 (catalyst loading: 600 mg cm-2, 1600 RPM, 10 mV s-1).

Figure 6:
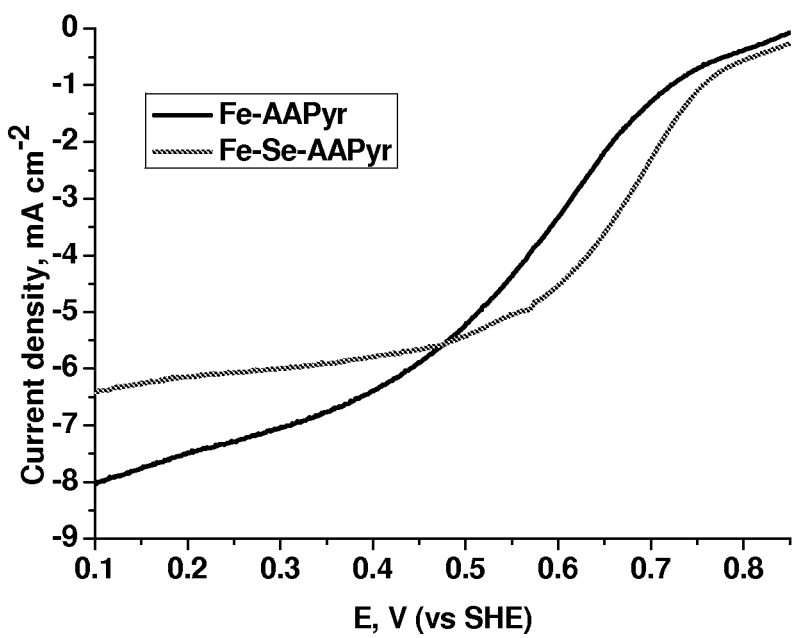
FIG. 6 is a Rotating Disc Electrode electro-voltamogram demonstrating oxygen reduction activity for Fe-AAPyr and Fe—Se-AAPyr in 0.5M $H_2SO_4$ saturated with $O_2$ (catalyst loading: 600 mg $cm^{-2}$, 1600 RPM, 10 mV $s^{-1}$).

FIG. 6 is a Rotating Disc Electrode electro-voltamogram demonstrating oxygen reduction activity for Fe-AAPyr and Fe—Se-AAPyr in 0.5M H2SO4 saturated with O2 (catalyst loading: 600 mg cm-2, 1600 RPM, 10 mV s-1).

Figure 7:
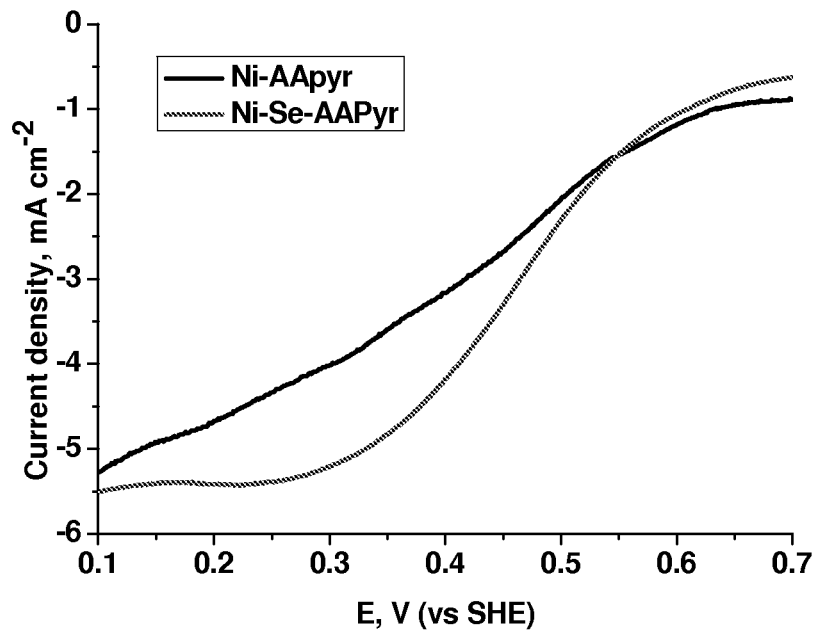
FIG. 7 is a Rotating Disc Electrode electro-voltamogram demonstrating oxygen reduction activity for Ni-AAPyr and Ni—Se-AAPyr in 0.5M $H_2SO_4$ saturated with $O_2$ (catalyst loading: 600 mg $cm^{-2}$, 1600 RPM, 10 mV $s^{-1}$).

FIG. 7 is a Rotating Disc Electrode electro-voltamogram demonstrating oxygen reduction activity for Ni-AAPyr and Ni—Se-AAPyr in 0.5M H2SO4 saturated with O2 (catalyst loading: 600 mg cm-2, 1600 RPM, 10 mV s-1).

Figure 8:
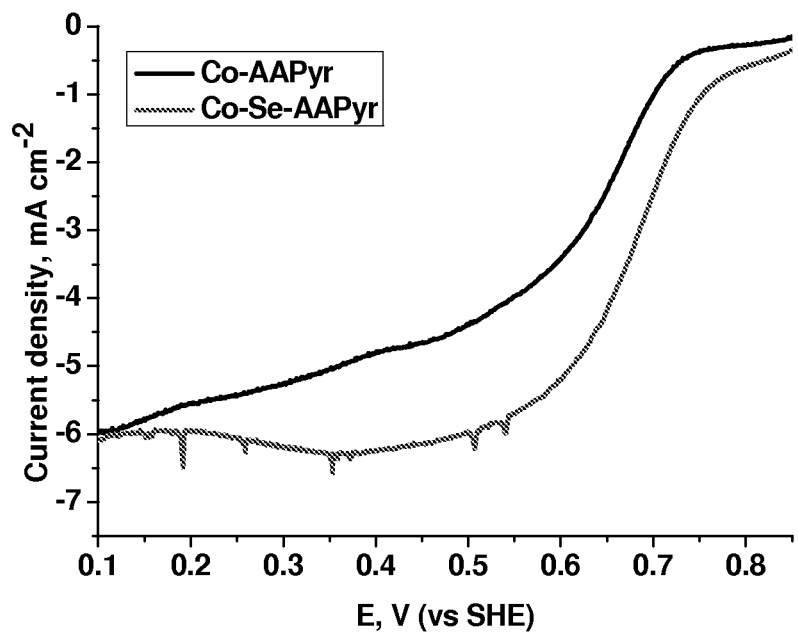
FIG. 8 is a Rotating Disc Electrode electro-voltamogram demonstrating oxygen reduction activity for Co-AAPyr and Co—Se-AAPyr in 0.5M $H_2SO_4$ saturated with $O_2$ (catalyst loading: 600 mg $cm^{-2}$, 1600 RPM, 10 mV $s^{-1}$).

FIG. 8 is a Rotating Disc Electrode electro-voltamogram demonstrating oxygen reduction activity for Co-AAPyr and Co—Se-AAPyr in 0.5M H2SO4 saturated with O2 (catalyst loading: 600 mg cm-2, 1600 RPM, 10 mV s-1).

As stated above, the presently described catalytic materials can also be synthesized using a two-step procedure. In this procedure, the N—C and metal precursors and infused in the sacrificial support, which is then subjected to a first heat treatment step, such as pyrolysis in order to produce a Fe—N—C material that is rich with unreacted iron. The Fe—N—C material is then exposed to the chalcogenide precursor and the material is subjected to a second heat treatment step, which may be, for example, a second pyrolysis treatment, resulting in newly formed active sites containing FeCh. After the second heat treatment, the sacrificial support is removed using chemical etching or other suitable means as described above.

In embodiments utilizing a two-step procedure, and therefore, two separate heat treatment steps, it may be desirable for the different heat treatment steps to be conducted under different conditions, for example at different temperatures and/or for different durations of time. For example, the first heat treatment step may be performed at a higher temperature, such as 800° C. for 1 hr and the second heat treatment step may be performed at a lower temperature, such as between 300 and 500° C. for a longer period of time, such as 3 hours.

It will be appreciated that if it is desirable to have complete control over the morphology of the resulting catalytic material, one may wish to template the precursors into sacrificial supports with known shapes and sizes. According to a particular embodiment where the sacrificial support is formed from silica particles, different shapes and sizes of sacrificial supports may be produced by using different types of silica to reliably and reproducibly produce differently sized silica particles. The resulting catalysts will then have a multi-modal pore distribution, where the specific size and shape of the pores is known.

It will be appreciated that some in some applications a mono-metallic catalyst may not be sufficiently stable or active to replace traditional platinum- or platinum alloy-based catalysts. Accordingly, as indicated above, according to some embodiments, the presently described method may incorporate the use of precursors of multiple metals in order to achieve a desired stability and/or activity.

According to some embodiments, it may be desirable to produce large amounts of the catalysts described herein, for example in a batch-wise process. Accordingly, the present disclosure further provides a method for large-scale preparation of the presently described catalysts. According to an embodiment, the present disclosure provides a method which combines a sacrificial support-based methodology with spray pyrolysis to produce self-supported catalysts. According to this method, the spray pyrolysis method is a continuous method while the sacrificial support-based methodology is performed batch-wise. According to an exemplary method, the precursor materials described herein (with or without the chalcogenide precursor, depending on whether a one- or two-step synthesis method is being utilized) are mixed with a silica support, atomized, and dried in a tube furnace. The powder obtained from this procedure is then collected on a filter. The collected powder is then heat treated. If a two-step synthesis method is to be used, the chalcogenide precursors are then added to the heat treated powder, which then undergoes a second heat treatment step. Finally, the sacrificial support is removed, for example by leaching with HF or KOH.

It will be appreciated that the above-described large-scale production method is suitable for use for a wide variety of precursors and materials and thus not necessarily limited to the catalysts disclosed herein.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below. The reaction tests shown and described in the drawings and in the following examples clearly demonstrate that M-Ch-N—C catalysts prepared from inexpensive precursors using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, M-Ch-N—C catalysts of the composition and using the preparation method described, including but not limited to the described materials shown herein, are effective catalysts for oxygen reduction.

EXAMPLES

1. Single Step Synthesis of Fe—N—C—Se

Fe—N—C—Se catalysts were prepared via wet impregnation of iron, piperazine and $H_2SeO_3$ precursors onto the surface of fumed silica (Cab-O-Sil™ EH-5, surface area: ~400 m2 g-1). First, a 20 g of silica were dispersed in water using the sonobath. Then, a solution of 45 g of piperazine in water was added to silica, and sonicated for 20 minutes. Then, an aqueous solution of 7.5 g iron nitrate ($Fe(NO_3)_3.9H_2O$, Sigma-Aldrich) was added to the $SiO_2$-Piperazine solution, followed by addition of 12 g of $H_2SeO_3$ and then sonicated for 8 hours in the sonobath. After sonication, a viscous solution of silica and Fe-Piperazine-$H_2SeO_3$ was dried overnight at T=85° C. The solid was ground to a fine powder in an agate mortar, and then subjected to the heat treatment (HT). The conditions of HT were: UHP N2 atmosphere flowing at a rate of 100 cc min-1, HT temperatures of 800° C., HT temperature ramp rates of 10° C. min-1, and HT durations of 1 hour. After heat treatment silica support was etched by means of 25 wt % HF solution for 12 hours. The resulting powder was washed by DI water until neutral pH.

2. Single step synthesis of Fe—N—C—S

Fe—N—C—S catalysts were prepared via wet impregnation of iron, PhenyleneDiamine and $H_2SO_3$ precursors onto the surface of fumed silica (Cab-O-Sil™ EH-5, surface area: ~400 m2 g-1). First, a 10 g of silica were dispersed in water using the sonobath. Then, a solution of 35 g of PhenyleneDiamine in water was added to silica, and sonicated for 20 minutes. Then, an aqueous solution of 4.5 g iron nitrate ($Fe(NO_3)_3.9H_2O$, Sigma-Aldrich) was added to the $SiO_2$-PhenyleneDiamine followed by addition of 4.5 g of $H_2SO_3$ solution and then sonicated for 8 hours in the sonobath. After sonication, a viscous solution of silica and Fe-PhenyleneDiamine-$H_2SO_3$ was dried overnight at T=85° C. The solid was ground to a fine powder in an agate mortar, and then subjected to the heat treatment (HT). The conditions of HT were: UHP N2 atmosphere flowing at a rate of 100 cc min-1, HT temperatures of 800° C., HT temperature ramp rates of 10° C. min-1, and HT durations of 1 hour. After heat treatment silica support was etched by means of 25 wt % HF solution for 12 hours. The resulting powder was washed by DI water until neutral pH.

3. Single Step Synthesis of Fe—N—C—Te

Fe—N—C—S catalysts were prepared via wet impregnation of iron, phenanthroline and $H_2TeO_3$ precursors onto the surface of fumed silica (Cab-O-Sil™ EH-5, surface area: ~400 m2 g-1). First, a 10 g of silica were dispersed in water using the sonobath. Then, a solution of 35 g of phenanthroline in water was added to silica, and sonicated for 20 minutes. Then, an aqueous solution of 4.5 g iron nitrate ($Fe(NO_3)_3.9H_2O$, Sigma-Aldrich) was added to the $SiO_2$-phenanthroline followed by addition of 5.8 g of $H_2TeO_3$ solution and then sonicated for 8 hours in the sonobath. After sonication, a viscous solution of silica and Fe-Phenanthroline-$H_2TeO_3$ was dried overnight at T=85° C. The solid was ground to a fine powder in an agate mortar, and then subjected to the heat treatment (HT). The conditions of HT were: UHP N2 atmosphere flowing at a rate of 100 cc min-1, HT temperatures of 800° C., HT temperature ramp rates of 10° C. min-1, and HT durations of 1 hour. After heat treatment silica support was etched by means of 25 wt % HF solution for 12 hours. The resulting powder was washed by DI water until neutral pH.

4. Two Step Synthesis of Fe—N—C—Se

Fe—N—C—Se catalysts were prepared via two-step synthesis. First step was based on wet impregnation of iron and Poly(2-ethyl-2-oxazoline) precursors onto the surface of fumed silica (Cab-O-Sil™ EH-5, surface area: ~400 m2 g-1). First, a 26 g of silica were dispersed in water using the sonobath. Then, a solution of 55 g of Poly(2-ethyl-2-oxazoline) in water was added to silica, and sonicated for 20 minutes. Then, an aqueous solution of 10.5 g iron nitrate (Fe(NO3)3.9H2O, Sigma-Aldrich) was added to the SiO2-Poly(2-ethyl-2-oxazoline) solution and then sonicated for 8 hours in the sonobath. After sonication, a viscous solution of silica and Fe-Poly(2-ethyl-2-oxazoline) was dried overnight at T=85° C. and then subjected to a first heat treatment (HT1) at 800° C. for 3 hours. The resulting solid was ground to a fine powder in an agate mortar, dispersed in solution of 23 g of H2SeO3, followed by drying at T=85 C overnight and then subjected to a second heat treatment (HT2). The conditions of HT2 were: UHP N2 atmosphere flowing at a rate of 100 cc min-1, HT temperatures of between 300-500° C., HT temperature ramp rates of 10° C. min-1, and HT duration of 1 hour. After HT2, the silica support was etched by means of 25 wt % HF solution for 12 hours. The resulting powder was washed by DI water until neutral pH.

5. Two Step Synthesis of Fe—N—C—S

Fe—N—C—S catalysts were prepared via two-step synthesis. First step was based on wet impregnation of iron and piperidine precursors onto the surface of fumed silica (Cab-O-Sil™ EH-5, surface area: ~400 m2 g-1). First, a 46 g of silica were dispersed in water using the sonobath. Then, a solution of 125 g of piperidine in water was added to silica, and sonicated for 20 minutes. Then, an aqueous solution of 20.5 g iron nitrate (Fe(NO3)3.9H2O, Sigma-Aldrich) was added to the SiO2-piperidine and then sonicated for 8 hours in the sonobath. After sonication, a viscous solution of silica and Fe-piperidine was dried overnight at T=85° C. and then subjected to a first heat treatment (HT1) at 800° C. for 3 hours. The solid was ground to a fine powder in an agate mortar, was dispersed in solution of 18 g of H2SO3, followed by drying at T=85 C overnight and then subjected to a second heat treatment (HT2). The conditions of HT2 were: UHP N2 atmosphere flowing at a rate of 100 cc min-1, HT temperatures of 300-500° C., HT temperature ramp rates of 10° C. min-1, and HT durations of 1 hour. After HT2, the silica support was etched by means of 25 wt % HF solution for 12 hours. The resulting powder was washed by DI water until neutral pH.

6. Two Step Synthesis of Fe—N—C—Te

Fe—N—C—Te catalysts were prepared via two-step synthesis. First step was based on wet impregnation of iron and imidazole precursors onto the surface of fumed silica (Cab-O-Sil™ EH-5, surface area: ~400 m2 g-1). First, a 16 g of silica were dispersed in water using the sonobath. Then, a solution of 38 g of imidazole in water was added to silica, and sonicated for 20 minutes. Then, an aqueous solution of 10.5 g iron nitrate (Fe(NO3)3.9H2O, Sigma-Aldrich) was added to the SiO2-imidazole and then sonicated for 8 hours in the sonobath. After sonication, a viscous solution of silica and Fe-imidazole was dried overnight at T=85° C. and then subjected to a first heat treatment (HT1) at 800° C. for 3 hours. The solid was ground to a fine powder in an agate mortar, was dispersed in solution of 8 g of H2TeO3, followed by drying at T=85 C overnight and then subjected to a second heat treatment (HT2). The conditions of HT2 were: UHP N2 atmosphere flowing at a rate of 100 cc min-1, HT temperatures of 300-500° C., HT temperature ramp rates of 10° C. min-1, and HT durations of 1 hour. After HT2, the silica support was etched by means of 25 wt % HF solution for 12 hours. The resulting powder was washed by DI water until neutral pH.

What is claimed is:

1. A method for forming a catalytic material comprising:
providing sacrificial template particles;
reaction of a metal precursor, a Nitrogen-Carbon (NC) precursor, and a selenium or tellurium precursor onto the sacrificial template particles to produce dispersed precursors;
heat treating the dispersed precursors; and
removing the sacrificial template particles to produce a highly dispersed, self-supported, high surface area catalytic material.

2. The method of claim 1 wherein the catalytic material contains more than one type of active site.

3. The method of claim 1 wherein:
the metal precursor and NC precursor are reacted onto the sacrificial template particles and the dispersed metal and NC precursors are heat treated prior to addition of the selenium or tellurium precursor; and
the sacrificial template particles are heat treated again after addition of the selenium or tellurium precursor, followed by removal of the sacrificial support.

4. The method of claim 1 wherein each type of active site includes the same metal element, but differs structurally from the other types of active sites.

5. The method of claim 1 wherein the selenium precursor is selenious acid.

6. The method of claim 1 wherein heat treating consists of pyrolysis.

7. The method of claim 1 wherein the tellurium precursor is tellurious acid, elemental tellurium or organic of tellurium.

8. A catalytic material comprising at least two different types of active sites, wherein active sites are considered to be of the same type if they catalyze the same type of reaction through the same mechanism; and wherein one of the types of active sites includes a atomically dispersed metal-selenide or metal-telluride moiety.

9. The catalytic material of claim 8 wherein each type of active site catalyzes oxygen reduction via a different mechanism.

10. The catalytic material of claim 8 further comprising Fe—$N_4$ active sites.

11. The catalytic material of claim 10 wherein the Fe—$N_4$ active sites are active for a direct $4e^{31}$ mechanism and the metal-selenide or metal-telluride active sites are a dual site mechanism resulting in the formation of hydrogen peroxide ($H_2O_2$) and water.

12. A catalytic material formed by:
providing sacrificial template particles;
reaction of a metal precursor, a Nitrogen-Carbon (NC) precursor, and a selenium or tellurium precursor onto the sacrificial template particles to produce dispersed precursors;
heat treating the dispersed precursors; and
removing the sacrificial template particles to produce a highly dispersed, self-supported, high surface area catalytic material.

13. The catalytic material of claim 12 wherein the metal precursor and NC precursor are reacted onto the sacrificial template particles and the dispersed metal and NC precursors are heat treated prior to addition of the selenium or tellurium precursor; and the sacrificial template particles are heat treated again after addition of the selenium or tellurium precursor, followed by removal of the sacrificial support.

* * * * *